(12) United States Patent
Wang

(10) Patent No.: US 12,741,213 B2
(45) Date of Patent: Sep. 22, 2026

(54) INTERFACE DISPLAY METHOD AND APPARATUS, TERMINAL, STORAGE MEDIUM, AND COMPUTER PROGRAM PRODUCT

(71) Applicant: Tencent Technology (Shenzhen) Company Limited, Shenzhen (CN)

(72) Inventor: Junxiang Wang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 522 days.

(21) Appl. No.: 18/214,980

(22) Filed: Jun. 27, 2023

(65) Prior Publication Data

US 2023/0338849 A1 Oct. 26, 2023

Related U.S. Application Data

(63) Continuation of application No. PCT/CN2022/128539, filed on Oct. 31, 2022.

(30) Foreign Application Priority Data

Jan. 21, 2022 (CN) ........................ 202210074263.1

(51) Int. Cl.
*A63F 13/5378* (2014.01)
*A63F 13/837* (2014.01)

(52) U.S. Cl.
CPC ........ *A63F 13/5378* (2014.09); *A63F 13/837* (2014.09)

(58) Field of Classification Search
CPC .. A63F 13/5378; A63F 13/837; A63F 13/803; A63F 13/2145; A63F 13/537;
(Continued)

(56) References Cited

U.S. PATENT DOCUMENTS 8,641,526 B1 * 2/2014 Sitnikov ................. A63F 13/67 463/37
8,734,250 B2 * 5/2014 Sitnikau ............. A63F 13/5258 463/31
(Continued)

FOREIGN PATENT DOCUMENTS

CN 113101636 A 7/2021
CN 113318434 A 8/2021
(Continued)

OTHER PUBLICATIONS

Google, "Google Earth", https://earth.google.com/, initial launch 2005., screenshots of different features on the UI (hereinafter as Google Earth). (Year: 2015).*
(Continued)

*Primary Examiner* — Ankit B Doshi
(74) *Attorney, Agent, or Firm* — ARENTFOX SCHIFF LLP

(57) ABSTRACT

In a method for displaying a search image, a virtual scene from a perspective of a virtual object that is in flight and a user interface (UI) are displayed. The search image is displayed with the UI in response to a continuous touch operation. The search image is from a search perspective of the virtual object and corresponds to a local region of the
(Continued)

virtual scene. The display of the search image is updated in response to an adjustment of the search perspective according to the continuous touch operation.

20 Claims, 8 Drawing Sheets

(58) Field of Classification Search
CPC ..... A63F 13/42; G01C 21/367; G06T 19/003; G06T 19/006
See application file for complete search history.

(56) References Cited

U.S. PATENT DOCUMENTS

| | | | | |
|---|---|---|---|---|
| 9,003,424 | B1 | 4/2015 | Mendes da Costa et al. | |
| 9,298,345 | B2 * | 3/2016 | Ofek | G06F 3/04815 |
| 10,713,569 | B2 * | 7/2020 | Ros Sanchez | G06N 3/084 |
| 2008/0033641 | A1 * | 2/2008 | Medalia | G06F 3/04815 701/533 |
| 2011/0245942 | A1 * | 10/2011 | Yamamoto | A63F 13/803 700/91 |
| 2014/0099606 | A1 * | 4/2014 | Sitnikau | A63F 13/803 434/29 |
| 2016/0279519 | A1 * | 9/2016 | Takahashi | A63F 13/42 |
| 2020/0211295 | A1 * | 7/2020 | Skidmore | G06F 3/011 |
| 2021/0187390 | A1 * | 6/2021 | Liu | A63F 13/537 |

FOREIGN PATENT DOCUMENTS

| | | | |
|---|---|---|---|
| CN | 114470772 | A | 5/2022 |
| JP | 2005-152318 | A | 6/2005 |
| JP | 2008-272123 | A | 11/2008 |
| KR | 10-1396291 | B1 | 5/2014 |

OTHER PUBLICATIONS

"Helicopter Air Attack—Gunship Strike 3D—A thorough review after playing it thoroughly!", Smartphone Game Channel, Available on internet at: <https://gameappch.com/app/?app=02595>, Jan. 11, 2016, pp. 1-9 (Original Copy only).

"Russian Federation Top Room Helicopter Rush Tutorial (Simple Version)", bilibili, Available on internet at: <https://www.bilibili.com/video/BV1W5411w7Zy/spm_id_from=333.999.0.0&vd_source=5b17668f23f6c5a54aa20a68969528f7>, 2021, pp. 1-4 (Original Copy only).

Office Action received for Chinese Patent Application No. 202210074263.1, mailed on Jan. 27, 2025, with English Translation, 18 pages.

Office Action received for Japanese Patent Application No. 2024-524706, mailed on Feb. 25, 2025, 10 pages (5 pages of English Translation and 5 pages of Original Document).

International Search Report and Written Opinion received for PCT Patent Application No. PCT/CN2022/128539, mailed on Jan. 16, 2023.

Whisky 1026, "Shooting game magnifying glass. no longer have to stick your face to the screen", Bilibili, Available on internet at: https://www.bilibili.com/video/av544215984, Feb. 10, 2021, pp. 1-6.

"Helicopter rush tutorial", bilibili, May 2, 2021, 1 page (Original document only).

Office Action received for Korean Patent Application No. 10-2024-7013369, mailed on Aug. 20, 2025, 13 pages (7 pages of English Translation and 6 pages of Original Document).

* cited by examiner

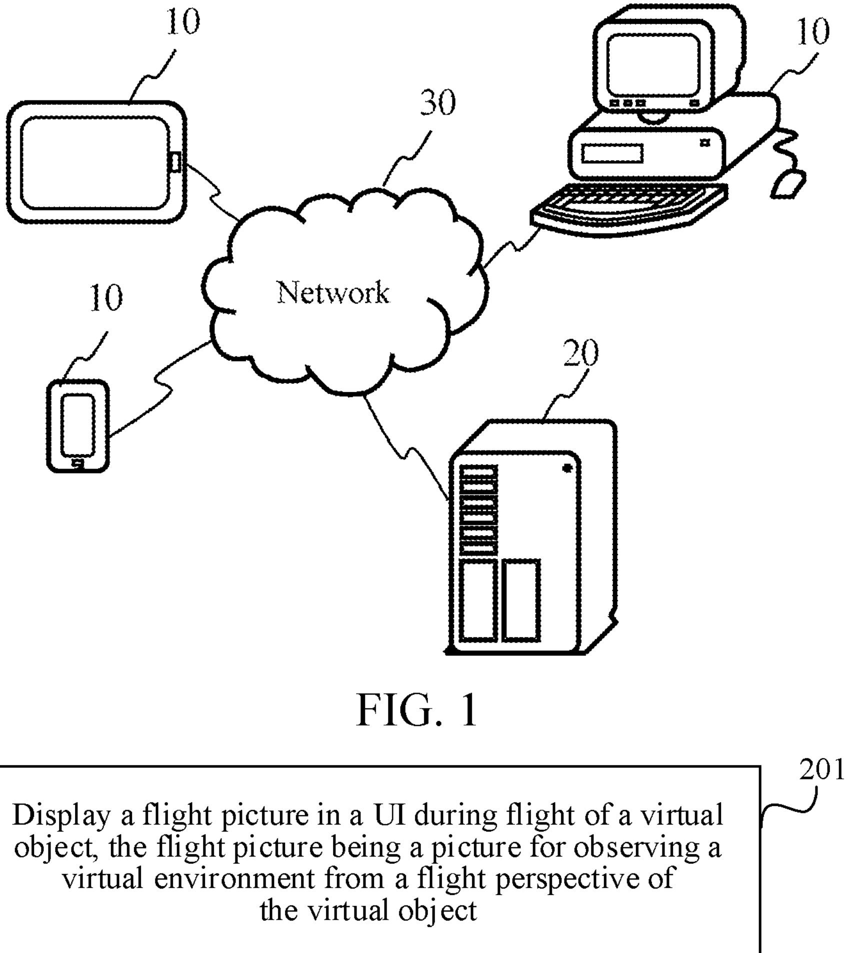

FIG. 1

Display a flight picture in a UI during flight of a virtual object, the flight picture being a picture for observing a virtual environment from a flight perspective of the virtual object (201)

↓

Display, during a display of the flight picture, a search picture in response to a search operation, the search picture being a picture for searching the virtual environment from a search perspective of the virtual object and the virtual environment displayed in the search picture being a local region of the virtual environment displayed in the flight picture (202)

↓

Adjust to display the search picture in response to an adjustment operation for the search perspective (203)

Picture display module

1002

Picture adjustment module

1003

Object following module

1004

Information generation module

1005

Information display module

INTERFACE DISPLAY METHOD AND APPARATUS, TERMINAL, STORAGE MEDIUM, AND COMPUTER PROGRAM PRODUCT

RELATED APPLICATIONS

The present application is a continuation of International Application No. PCT/CN2022/128539 filed on Oct. 31, 2022, which claims priority to Chinese Patent Application No. 202210074263.1, entitled "INTERFACE DISPLAY METHOD AND APPARATUS, TERMINAL, STORAGE MEDIUM, AND COMPUTER PROGRAM PRODUCT", filed on Jan. 21, 2022. The entire disclosures of the prior applications are hereby incorporated by reference.

FIELD OF THE TECHNOLOGY

The embodiments of this disclosure relate to the technical field of computers and the Internet, including an interface display method and apparatus, a terminal, a storage medium, and a computer program product.

BACKGROUND OF THE DISCLOSURE

Currently, in game applications, a player may search a virtual ground of a virtual environment through a virtual flight vehicle to determine the position of a virtual character controlled by a hostile player.

Taking a shooting game application as an example, the player performs flight control on the virtual flight vehicle based on a flight perspective (such as a heads-up perspective) corresponding to the virtual flight vehicle, and uses the flight perspective to search the virtual ground of the virtual environment during the flight control of the virtual flight vehicle, to search out the virtual character controlled by the hostile player.

However, the identification degree of the ground visual field under the flight perspective can be poor, the ground search can be difficult, and the search efficiency can be low.

SUMMARY

The embodiments of this disclosure provide an interface display method and apparatus, a terminal, a non-transitory computer-readable storage medium, and a computer program product. For example, the embodiments can better ensure flight visual field required by flight control and search visual field required by a search operation during flight, reducing the search difficulty and improving the search efficiency.

According to an aspect of the embodiments of this disclosure, there is provided a method for displaying a search image. The method may be executed by a terminal device, for example. In the method, a virtual scene from a perspective of a virtual object that is in flight and a user interface (UI) are displayed. The search image is displayed with the UI in response to a continuous touch operation. The search image is from a search perspective of the virtual object and corresponds to a local region of the virtual scene. The display of the search image is updated in response to an adjustment of the search perspective according to the continuous touch operation.

According to an aspect of the embodiments of this disclosure, there is provided an information processing apparatus. The information processing apparatus includes processing circuitry that is configured to display a virtual scene from a perspective of a virtual object that is in flight and a user interface (UI). The processing circuitry is configured to display, with the UI, a search image in response to a continuous touch operation, the search image being from a search perspective of the virtual object and corresponding to a local region of the virtual scene. The processing circuitry is configured to update the display of the search image in response to an adjustment of the search perspective according to the continuous touch operation.

According to an aspect of the embodiments of this disclosure, there is provided a terminal device including a processor and a memory storing computer programs, the computer programs being loaded and executed by the processor to implement the method for displaying the search image.

According to an aspect of the embodiments of this disclosure, there is provided a non-transitory computer-readable storage medium storing instructions which when executed by a processor cause the processor to perform the method for displaying the search image.

According to an aspect of the embodiments of this disclosure, there is provided a computer program product including computer programs stored in a computer-readable storage medium. A processor of a terminal reads and executes the computer programs from the computer-readable storage medium, to cause the terminal to execute the method for displaying the search image.

During the flight of the virtual object, it is supported that the search picture is displayed while the flight picture is displayed, so that the flight visual field required by the flight control and the search visual field required by the search operation can be ensured during the flight; and the problem of large searching difficulty caused by the poor identification degree of the reference plane visual field under the flight perspective in the related art can be better avoided, thereby reducing the search difficulty and improving the search efficiency.

In addition, by adopting the technical solutions provided by the embodiments of this disclosure, it is possible to overcome the conflict between the flight perspective (such as a heads-up perspective) and the search perspective (such as a top-down perspective), and realize both the flight visual field and the search visual field without frequently switching the flight perspective and the search perspective to realize the flight control and search operation, thereby further improving the search efficiency.

BRIEF DESCRIPTION OF THE DRAWINGS

FIG. 1 is a diagram of an implementation environment of a solution provided by one embodiment of this disclosure.

FIG. 2 is a flowchart of an interface display method provided by one embodiment of this disclosure.

DESCRIPTION OF EMBODIMENTS

Figure 3:
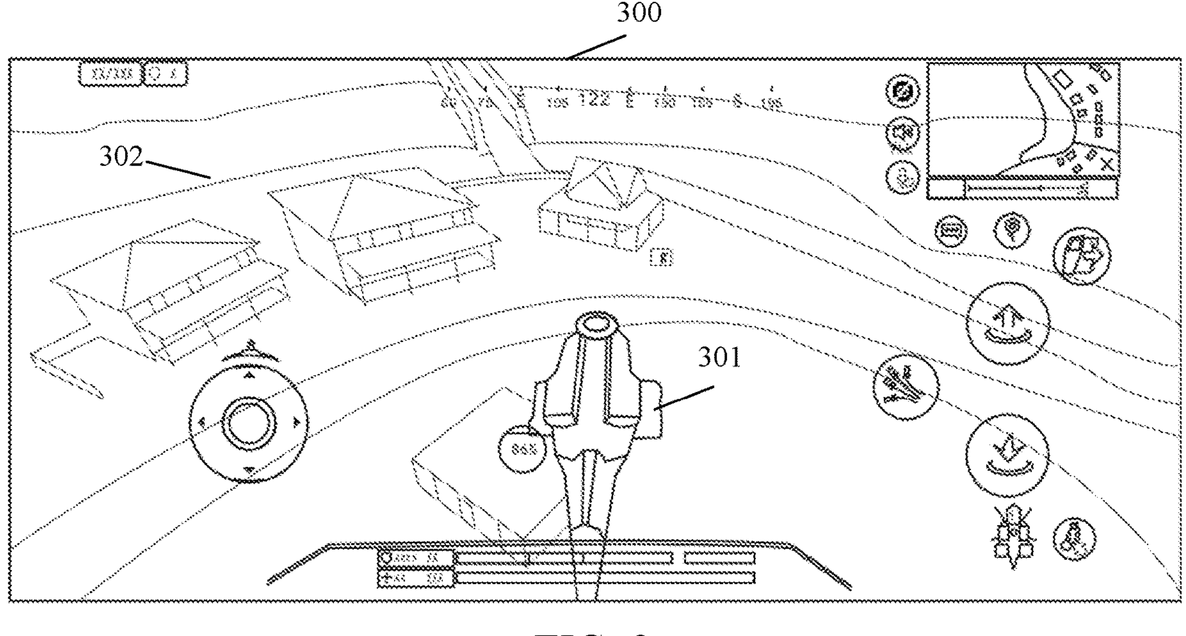
FIG. 3 is a diagram of a flight picture provided by one embodiment of this disclosure.

Referring to FIG. 1, a diagram of an implementation environment of a solution provided by one embodiment of this disclosure is shown. The implementation environment may include a terminal 10 and a server 20.

The terminal 10 may be an electronic device such as a mobile phone, a tablet, a game console, a multimedia playing device, and a personal computer (PC). A client of a target application, such as a game application and a simulated learning application, may be installed in the terminal 10. Illustratively, the terminal 10 may also be referred to as a terminal device 10.

The server 20 is configured to provide background services for a client of the application (such as a gaming application) in the terminal 10. For example, the server 20 may be a background server for the above application (such as a gaming application). The server 20 may be a server, a server cluster including a plurality of servers, or a cloud computing service center.

The terminal 10 and the server 20 may communicate with each other through a network 30. The network 30 may be a wired network or a wireless network.

Illustratively, taking the client applying a game application as an example, during the flight of a virtual object (such as a virtual flight vehicle, a virtual character, and a virtual search device), a UI displays a flight picture under a flight perspective; and a player may display a search picture while displaying the flight picture by triggering a search control in the UI, to search a virtual character controlled by a hostile player through the search picture without affecting the flight visual field.

Referring to FIG. 2, a flowchart of an interface display method provided by one embodiment of this disclosure is shown. The main body of each step of the method may be the terminal 10 in the implementation environment of the solution shown in FIG. 1. The method may include the following steps (steps 201 to 203).

In step 201, a flight picture is displayed in a UI during flight of a virtual object, the flight picture being a picture for observing a virtual environment from a flight perspective of the virtual object. In an example, a virtual scene from a perspective of a virtual object that is in flight and a user interface (UI) are displayed In the embodiments of this disclosure, the above virtual object may refer to a virtual character controlled by a user account in an application. Taking a shooting game application as an example, the virtual object refers to a game character controlled by the user account in the game application, the game character having the ability to fly. The above virtual object may also refer to a virtual flight vehicle driven by a virtual character in an application, such as a virtual aircraft, a virtual helicopter, and a virtual hot balloon. The above virtual object may also refer to a virtual search device controlled by the virtual character in the application, such as a virtual unmanned aerial vehicle. The type of the virtual object is not limited in the embodiments of this disclosure.

A UI may refer to a display interface of an application, such as a display interface of the above target application. Illustratively, in the shooting game application, the UI may be a display interface of a game match for presenting a virtual environment of the game match to the user. In a simulated learning application, the UI may be a display interface of a learning scene for presenting a simulated environment in the learning scene to the user. In some embodiments, the UI includes a display layer and a control layer. The display level of the control layer is higher than the display level of the display layer. The display layer is configured to display picture information (such as a flight picture and a search picture); and the control layer is configured to display controls of the UI (such as search controls and flight remote sensing controls below).

In some embodiments, the flight perspective refers to a perspective for assisting flight control during the flight of the virtual object; and a player may acquire a corresponding flight visual field through the flight perspective, and then control the flight direction, speed, and the like of the virtual object based on the virtual environment in the flight visual field. Illustratively, the flight perspective may refer to a heads-up perspective, that is, a generalized perspective with a virtual object as a centerline. For example, during the flight of the virtual object, the flight perspective may be adjusted by adjusting the flight angle of the virtual object to view the virtual sky, virtual ground, and the like.

The virtual environment may be an environment displayed (or provided) when a client of an application (such as a game application) runs on a terminal, and the virtual environment may refer to an environment created for the virtual object to perform an activity (such as game competition), for example, it can be a virtual house, a virtual island, a virtual sky, and a virtual land. The virtual environment may be a real-world simulation environment, or may be a semi-simulation semi-fiction environment, or may be a purely fictional environment, which is not limited by the embodiments of this disclosure.

Illustratively, referring to FIG. 3, during flight of the virtual flight vehicle 301, a flight picture 302 is displayed in the UI 300, the flight picture 302 being a picture in which the virtual environment is viewed from the flight perspective of the virtual flight vehicle 301.

In step 202, during a display of the flight picture, a search picture is displayed in response to a search operation, the search picture being a picture for searching the virtual environment from a search perspective of the virtual object and the virtual environment displayed in the search picture being a local region of the virtual environment displayed in the flight picture. In an example, the search image is displayed with the UI in response to a continuous touch operation. The search image is from a search perspective of the virtual object and corresponds to a local region of the virtual scene.

The search perspective refers to a perspective used for searching the virtual environment during the flight of the virtual object. The player may obtain the corresponding search visual field through the search perspective, and then search the target object based on the local virtual environment in the search visual field. Illustratively, the angle of the search perspective may be the same as the angle of the flight perspective. For example, the search perspective may be a generalized perspective with the virtual object as a centerline. The search perspective may also refer to any perspective other than a flight perspective, such as a top-down perspective for a reference plane (such as virtual ground and virtual sea surface) in a virtual environment. The angle of the search perspective is not limited in the embodiments of this disclosure. In some embodiments, the target object may refer to a virtual character, a virtual vehicle, a virtual object, and the like, which is not limited in the embodiments of this disclosure. The search picture is displayed on the same screen as the flight picture. In some embodiments, the search picture may be a partially magnified picture taken from the flight picture; the search picture may also be a picture photographed from a virtual environment by a corresponding virtual camera; and the virtual camera corresponding to the search picture may refer to a virtual camera with a higher magnification than the virtual camera corresponding to the flight picture.

Figure 4:
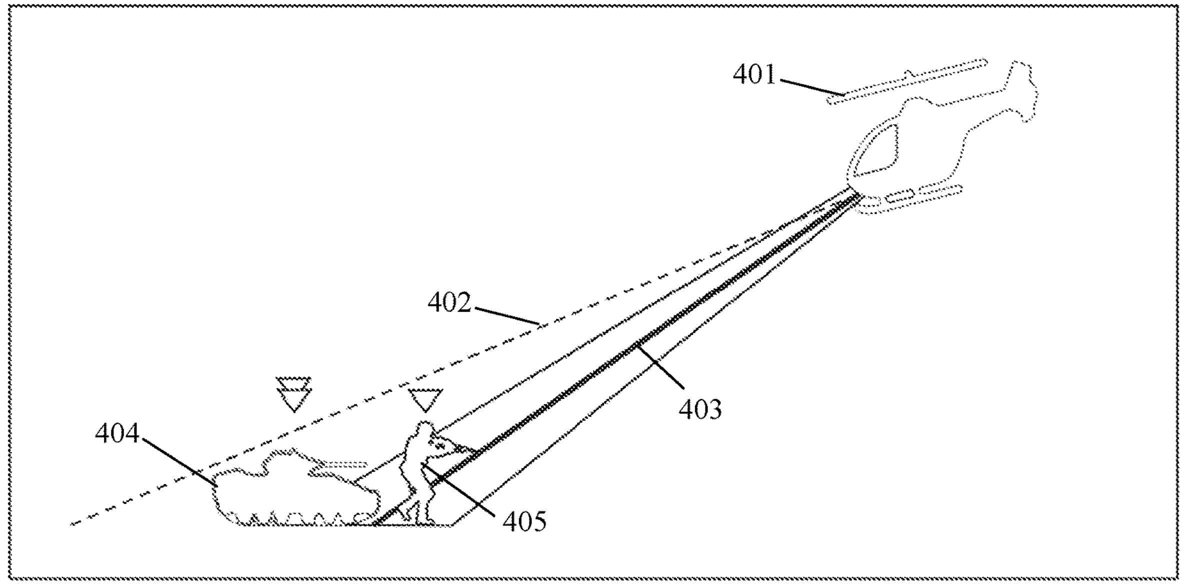
FIG. 4 is a diagram of a flight perspective and a search perspective provided by one embodiment of this disclosure.

For example, referring to FIG. 4, a virtual flight vehicle 401 corresponds to a heads-up perspective with the virtual flight vehicle 401 as a centerline (that is, a flight perspective 402). The virtual flight vehicle 401 also corresponds to a search perspective 403 (such as a top-down perspective) from the virtual flight vehicle 401, with a different angle from the flight perspective 402. A target object 404 and a target object 405 are included in the search visual field corresponding to the search perspective 403.

In some embodiments, a search operation is used for triggering to display a search picture; the search operation may be an operation such as a click, press, and slide. The search operation may refer to an operation performed by a player for a UI control in the UI.

In one example, the display process of the search picture may be as follows: acquiring a flight line of sight corresponding to a flight perspective; determining, in response to a triggering operation for a search control displayed in the UI, an initial search line of sight based on the flight line of sight; and displaying the search picture based on the initial search line of sight.

The flight line of sight refers to a centerline corresponding to the flight perspective, such as the centerline of the virtual flight vehicle 401 corresponding to the above flight perspective 402. The search line of sight refers to a centerline corresponding to the search perspective, such as the centerline corresponding to the above search perspective 403. In some embodiments, the flight line of sight may be determined as an initial search line of sight, or the initial search line of sight may be set an angle set apart from the flight line of sight, which is not limited by the embodiments of this disclosure.

A search control is used for triggering to display the search picture. The search control may refer to a remote sensing control, a button combination control, and the like. Illustratively, referring to FIG. 5, a search control 303 is displayed in the UI 300, and the search control 303 corresponds to a movable region 304. In an initial state, the search control 303 is located in the center of the movable region 304. The search picture 305 is triggered to display in response to a dragging operation (that is, a triggering operation) by the player for the search control 303 in the movable region 304, so that the search control 303 leaves the center of the movable region 304.

In some embodiments, the content and position of the search picture 305 is adjusted to display in response to a non-release dragging operation by the player for the search control 303; the search picture 305 is cancelled to display in response to a release operation by the player for the search control 303, and a search line of sight is initialized to the flight line of sight.

In some embodiments, a search picture corresponds to a display region, the display region referring to a local region in a virtual environment; and display elements (namely, display contents) corresponding to the local region are display elements of the search picture.

In one example, a method for acquiring a display region corresponding to the search picture may be as follows: acquiring a first collision point between the initial search line of sight and a reference plane of the virtual environment; determining a region corresponding to the first collision point in the virtual environment as a display region corresponding to the search picture; and displaying the search picture based on elements in the display region.

The reference plane refers to a flight reference plane of the virtual object during flight, which may be a virtual ground, a virtual sea surface, and the like in the virtual environment. In the embodiments of this disclosure, the collision point refers to the intersection of a detection ray and a collision box. For example, the first collision point refers to the intersection of the detection ray corresponding to the initial search line of sight and the collision box corresponding to the reference plane. The detection ray corresponding to the initial search line of sight may overlap the initial search line of sight.

In some embodiments, a region centered on the first collision point may be determined as a display region corresponding to the search picture, a regular region such as a circle and a square, and an irregular region such as a broken mirror. The display content of the search picture is determined based on the elements corresponding to the display region; and the search picture is displayed based on the display content of the search picture.

Figure 5:
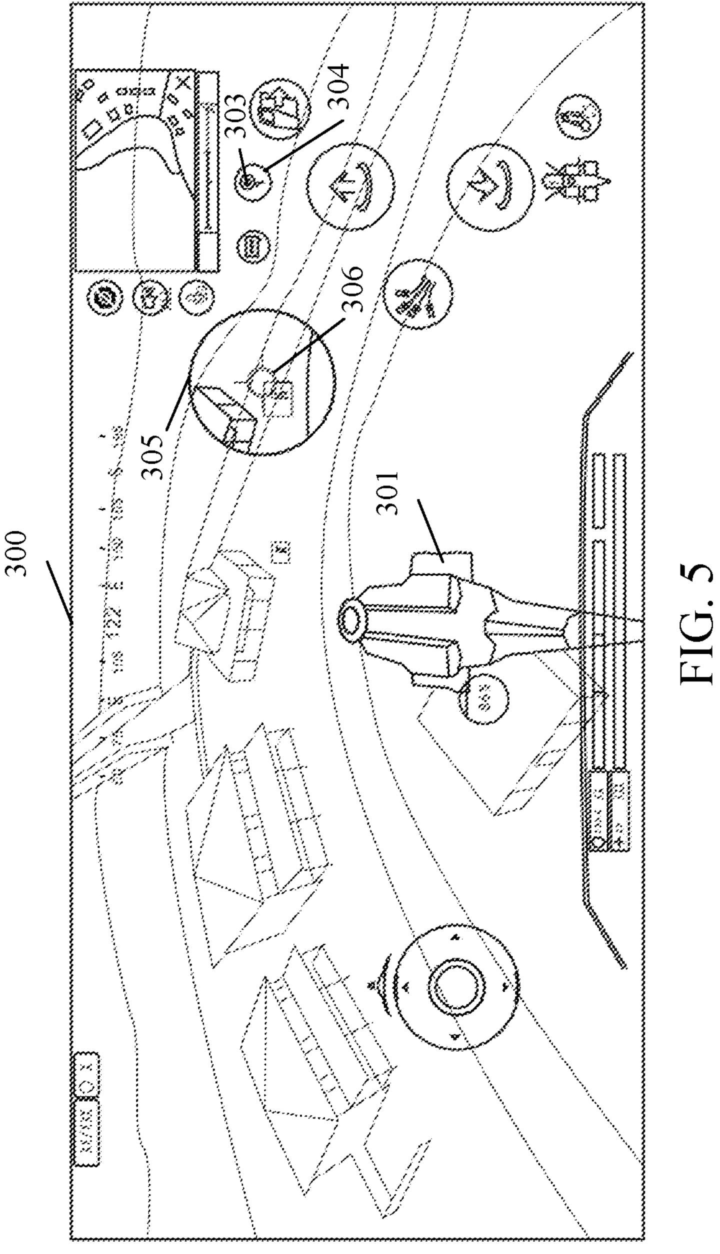
FIG. 5 is a diagram of a search picture provided by one embodiment of this disclosure.

Illustratively, referring to FIG. 4 and FIG. 5, in an initial state, the search line of sight corresponding to the search perspective 403 overlaps the flight line of sight corresponding to the flight perspective 402, that is, the first collision point between the search line of sight and the reference plane is the intersection of the flight line of sight and the reference plane. A circular region centered on the first collision point is determined as a display region corresponding to the search picture 305; and the display content corresponding to the display region is enlarged to obtain the display content corresponding to the search picture 305.

In step 203, the display of the search picture is adjusted in response to an adjustment operation for the search perspective. In an example, the display of the search image is updated in response to an adjustment of the search perspective according to the continuous touch operation.

In some embodiments, the following steps are performed: acquiring an adjusted search line of sight corresponding to the search perspective in response to the adjustment operation for the search perspective; acquiring a second collision point between the adjusted search line of sight and a reference plane of the virtual environment; determining a region corresponding to the second collision point in the virtual environment as an adjusted display region corresponding to the search picture; and adjusting to display the search picture based on elements in the adjusted display region.

The second collision point refers to the intersection of the detection ray corresponding to the adjusted search line of sight and the collision box corresponding to the reference plane. A region centered on the second collision point is determined as an adjusted display region; a display content corresponding to the adjusted display region is enlarged to obtain an adjusted display content corresponding to the search picture; and the search picture is adjusted to display based on the adjusted display content. For example, referring to FIG. 4, the initial search line of sight corresponding to the search perspective 403 is set as the centerline corresponding to the flight perspective 402, then the centerline corresponding to the search perspective 403 is the adjusted search line of sight, and the display region corresponding to the search perspective 403 is the adjusted display region.

In some embodiments, referring to FIG. 5, a non-release dragging operation may be performed on the search control 303 to adjust the display region corresponding to the search picture.

In one example, the acquisition process of the adjusted search line of sight may be as follows: acquiring a direction variable and a magnitude variable corresponding to the adjustment operation in response to the adjustment operation for the search perspective; determining, on the basis of the flight line of sight, a direction variable of the search line of sight based on the direction variable corresponding to the adjustment operation; determining, on the basis of the flight line of sight, a magnitude variable of the search line of sight based on the magnitude variable corresponding to the adjustment operation; and acquiring the adjusted search line of sight based on the direction variable of the search line of sight and the magnitude variable of the search line of sight.

The direction variable is used for mapping a change direction indicating the search line of sight, and the magnitude variable is used for mapping a change magnitude indicating the search line of sight. Illustratively, referring to FIG. 5, the vertical downward direction through the center point of the movable region is taken as a reference direction, the reference direction being the same as the direction of the flight line of sight of the virtual flight vehicle 301. Based on the coordinates of search control 303 and the reference direction, the direction variable and the magnitude variable are determined. For example, if the direction variable indicates that the search line of sight moves to the right side of the flight line of sight, the magnitude variable is combined to determine the magnitude of the movement of the search line of sight in the direction (that is, the magnitude variable), thereby determining the adjusted search line of sight.

In some embodiments, the second collision point is followed on a screen to move to display the search picture. For example, the second collision point is determined as the position center point of the search picture; and during the change of the second collision point, the display position of the search picture changes following the change of the second collision point. The search picture may be fixedly displayed at a set position on the screen. For example, the search picture is fixedly displayed on the upper right corner of the screen, and the display position of the search picture is not limited in the embodiments of this disclosure.

In one example, a flight remote sensing control corresponding to the virtual object is displayed in the UI, and a movable region corresponding to the flight remote sensing control includes a flight control region and a search control region. In an initial state, the flight remote sensing control is located at the center of the movable region.

In a case that the flight remote sensing control is located in the flight control region, the flight remote sensing control is used for controlling the flight perspective of the virtual object. In a case that the flight remote sensing control is located in the search control region, the flight remote sensing control is used for controlling the search perspective of the virtual object. The movable region refers to a region to which the flight remote sensing control is correspondingly movable.

In some embodiments, the search picture is displayed in response to the flight remote sensing control being moved from the center of the movable region to the search control region. For example, the flight control region is a circular region centered on the center of the movable region; and the search control region is a region centered on the center of the movable region, excluding the flight control region. The search picture is displayed in response to the player moving the flight remote sensing control from the flight control region to the search control region.

In some embodiments, the search picture is adjusted to display in response to an adjustment operation of the flight remote sensing control in the search control region. For example, referring to the above embodiments, after the display of the search picture, the search picture is adjusted to display in response to the player controlling movement of the flight remote sensing control in the search control region.

In some embodiments, the search picture is cancelled to display in response to the flight remote sensing control being moved or released from the search control region to the flight control region. For example, referring to the above embodiments, after the display of the search picture, the search picture is cancelled to display in response to the player moving or releasing the flight remote sensing control from the search control region to the flight control region.

In summary, the technical solutions provided by the embodiments of this disclosure support to display the search picture while displaying the flight picture during the flight of the virtual object, so that the flight visual field required by the flight control and the search visual field required by the search operation can be ensured during the flight; and the problem of large searching difficulty caused by the poor identification degree of the reference plane visual field under the flight perspective in the related art can be avoided, thereby reducing the search difficulty and improving the search efficiency.

In addition, by adopting the technical solutions provided by the embodiments of this disclosure, the conflict between the flight perspective (such as a heads-up perspective) and the search perspective (such as a top-down perspective) can be addressed, and both the flight visual field and the search visual field can be realized without frequently switching the flight perspective and the search perspective to realize the flight control and search operation, thereby further improving the search efficiency.

In addition, by following the second collision point on the screen to move to display the search picture, the display region corresponding to the search picture may be accurately characterized, further reducing the search difficulty and improving the search efficiency. At the same time, it is advantageous for players to search in a planned and strategic way, thereby improving the user experience. Moreover, by adjusting the search line of sight at two angles of the direction variable and the magnitude variable, the accuracy of adjusting the search line of sight is improved, and the accuracy of searching the flight picture is further improved.

Figure 6:
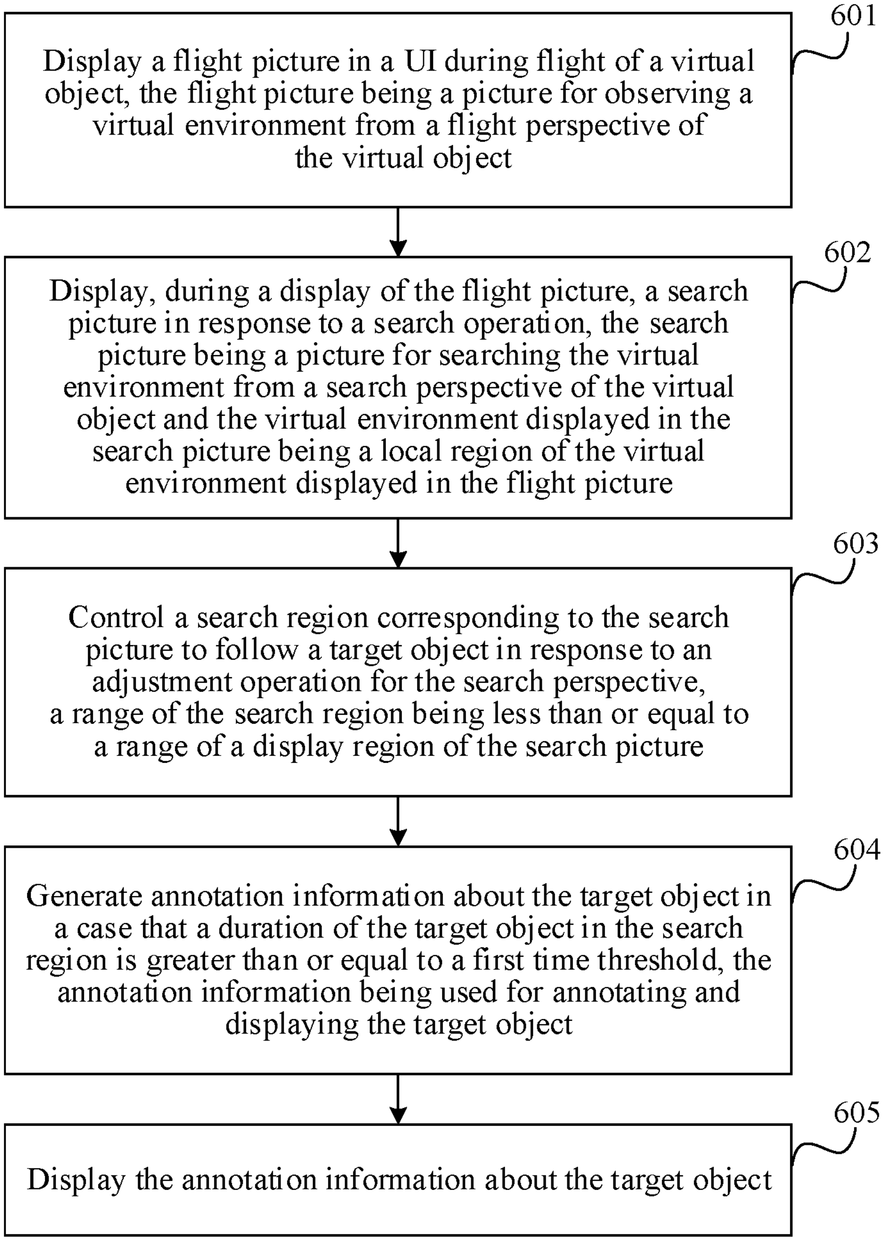
FIG. 6 is a flowchart of an interface display method provided by another embodiment of this disclosure.

Referring to FIG. 6, a flowchart of an interface display method provided by another embodiment of this disclosure is shown. The main body of each step of the method may be the terminal 10 in the implementation environment of the solution shown in FIG. 1. The method may include the following steps (steps 601 to 605).

In step 601, a flight picture is displayed in a UI during flight of a virtual object, the flight picture being a picture for observing a virtual environment from a flight perspective of the virtual object.

In step 602, during a display of the flight picture, a search picture is displayed in response to a search operation, the search picture being a picture for searching the virtual environment from a search perspective of the virtual object and the virtual environment displayed in the search picture being a local region of the virtual environment displayed in the flight picture.

Step 601 and step 602 can be the same as the above embodiments, for example. For contents not described in the embodiments of this disclosure, reference may be made to the above embodiments, for example.

In step 603, a search region corresponding to the search picture is controlled to follow a target object in response to the adjustment operation for the search perspective, a range of the search region being less than or equal to a range of a display region of the search picture.

The target object may refer to a virtual character, a virtual vehicle, a virtual object, and the like. The type of the target object is not limited in the embodiments of this disclosure. In the embodiments of this disclosure, the search region is used for capturing the target object. The center position of the search region may overlap with the center position of the display region of the search picture. The search region may be a shaped region such as a circle and a square.

For example, referring to FIG. 5, the search picture 305 corresponds to a search region 306. There is a target object in the search picture 305; and the player may control the search region 306 to follow the target object in the search picture by controlling the search control 303.

In step 604, annotation information about the target object is generated in a case that a duration of the target object in the search region is greater than or equal to a first time threshold, the annotation information being used for annotating and displaying the target object.

The first time threshold may be adaptively set and adjusted according to actual usage requirements, such as 1.5 seconds and 2 seconds. If the central position corresponding to the target object is located within the search region, it may be determined that the target object is within the search region. The player generates annotation information for the target object in a case that the duration exceeds the first time threshold by adjusting the search regions such that the target object persists between the search regions.

In some embodiments, the above annotation information includes first sub-annotation information, second sub-annotation information, and third sub-annotation information, the first sub-annotation information being used for indicating type information about the target object, the second sub-annotation information being used for indicating camp information about the target object, and the third sub-annotation information being used for indicating position information about the target object.

The first sub-annotation information is generated based on type information about the target object; the second sub-annotation information is generated based on camp information about the target object; and the third sub-annotation information is generated based on position information about the target object. Illustratively, the first sub-annotation information is displayed in an icon fashion. For example, a triangular icon represents a virtual character; a square represents a virtual vehicle; and a circle represents a virtual object. The second sub-annotation information is displayed in color. For example, red represents a virtual object controlled by a hostile player; and blue represents a virtual object in the same camp as the virtual object. The third sub-annotation information is displayed in the form of position coordinates.

For example, referring to FIG. 4, where the target object 404 and target object 405 are locked by the search region, a double triangle indicates that the target object 404 is a virtual vehicle, and a single triangle indicates that the target object 405 is a virtual character. If both the double triangle and the single triangle are marked in red, the target object 404 and the target object 405 belong to the hostile camp. The double triangle and the single triangle may indicate the position of the target object 404 and the position of the target object 405, respectively.

Figure 7:
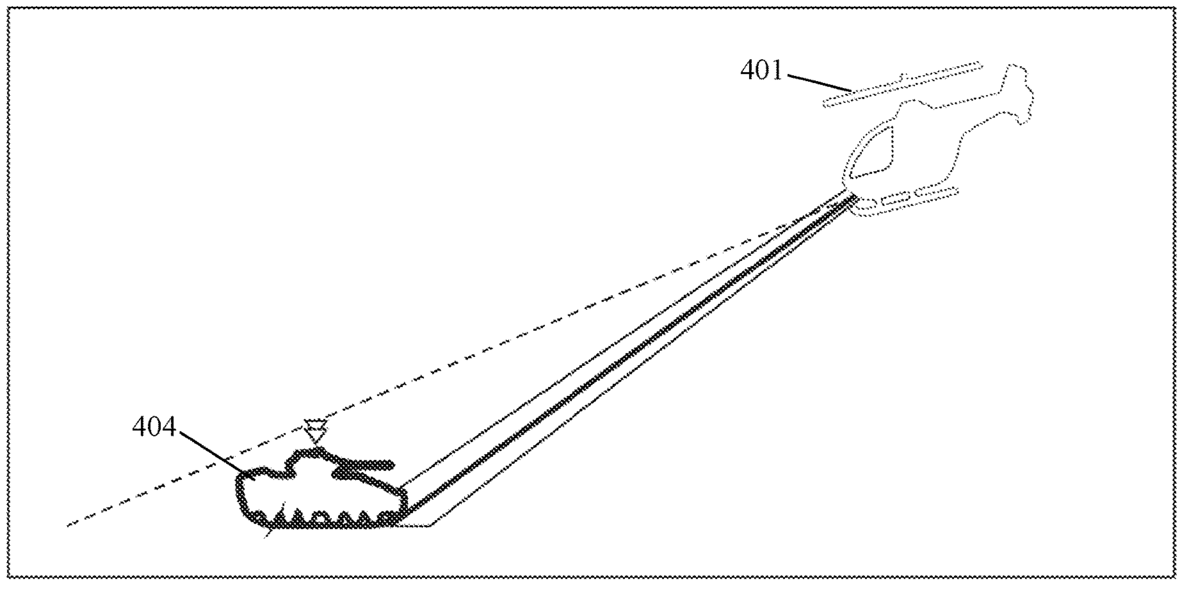
FIG. 7 is a diagram of a target object in a locked state provided by one embodiment of this disclosure.

In some embodiments, the search region may simultaneously lock the virtual vehicle and the virtual character, or may only lock the virtual character, or may only lock the virtual vehicle, which is not limited in the embodiments of this disclosure. For example, referring to FIG. 7, the search range corresponding to the virtual flight vehicle 401 only locks the target object 404 (such as a virtual tank).

In one example, the search region corresponding to the search picture includes a first display modality and a second display modality, the first display modality being used for indicating that the target object is in an unlocked state, and the second display modality being used for indicating that the target object is in a locked state.

Figure 8:
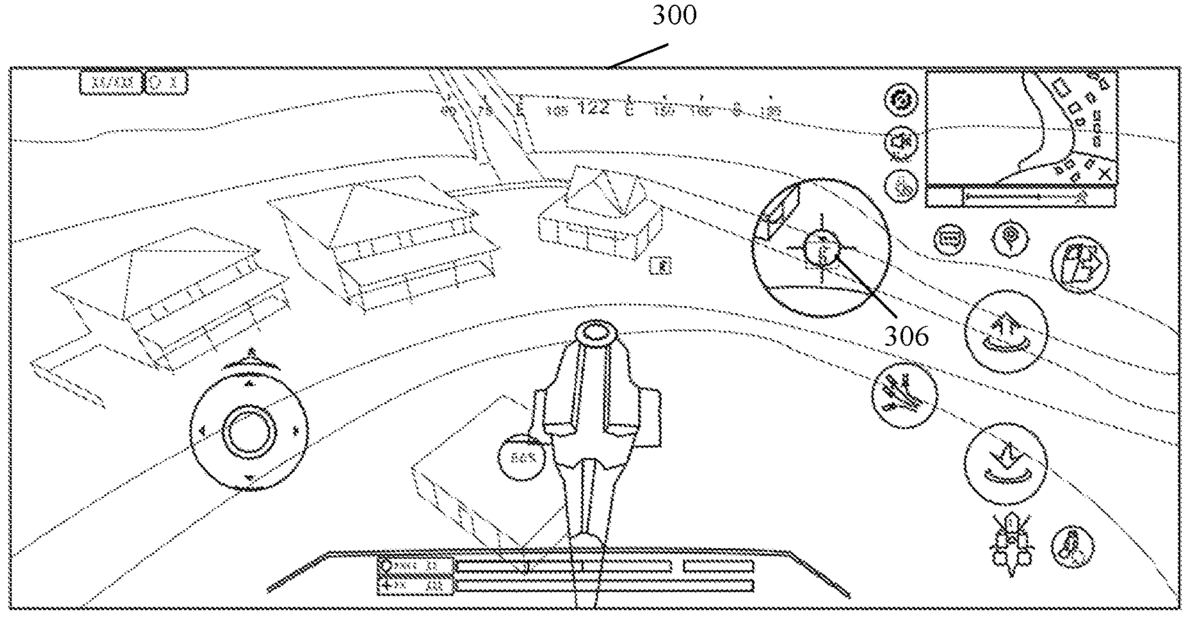
FIG. 8 is a diagram of a search region in a second display state provided by one embodiment of this disclosure.

The target object is switched from an unlocked state to a locked state and the search region is switched from the first display modality to the second display modality in a case that the duration of the target object in the search region is greater than or equal to the first time threshold. The second display modality is displayed differently from the first display modality. Illustratively, the search region in the second display modality is highlighted relative to the first display modality. Alternatively, the shape of the search region in the first display modality is different from the shape of the search region in the second display modality. Alternatively, the color of the search region in the first display modality is different from the color of the search region in the second display modality, which is not limited in the embodiments of this disclosure. For example, referring to FIG. 5 and FIG. 8, the search region 306 in the first display modality has a double-circle combined shape; the search region 306 in the second display modality has a single-circle shape; and the size of the search region 306 in the first display modality is larger than the size of the search region 306 in the second display modality. Thus, the displaying the first display modality differently from the second display modality and highlighting the second display modality, intuitively feeds back to the player whether the target object is locked, improving the acquisition efficiency of the information.

In step 605, the annotation information about the target object is displayed.

In some embodiments, annotation information is displayed above, to the left, to the right, and the like of the target object, for example, above the target object, first sub-annotation information indicating type information about the target object, second sub-annotation information indicating camp information about the target object, and third sub-annotation information indicating position information about the target object are displayed. The annotation information is visible to players in the same camp as the virtual object. In some embodiments, the annotation information may be displayed in the form of icons, text, and the like.

In one example, after displaying the annotation information about the target object, the following contents may also be included:

1. The annotation information about the target object is cancelled to display in a case that a display duration of the annotation information about the target object is greater than or equal to a second time threshold.

The second time threshold may be adaptively set and adjusted according to actual usage requirements, such as 30 seconds and 35 seconds.

2. The annotation information about the target object is cancelled to display in a case that a distance between the target object and the virtual object is greater than or equal to a first distance threshold.

The first distance threshold may be adaptively set and adjusted according to actual usage requirements, such as 35 meters and 40 meters.

3. The annotation information about the target object is cancelled to display in a case that it is detected that a virtual life value of the target object is less than or equal to a first life threshold.

The first life threshold may be adaptively set and adjusted according to actual usage requirements, such as 0 and 5.

In one example, the annotation process for the target object may also be as follows: detecting the search picture; generating annotation information about the target object in a case that it is detected that the search picture includes a target object, the annotation information being used for annotating and displaying the target object; and displaying the annotation information about the target object.

In some embodiments, after displaying the search picture, the client automatically detects the target object in the search picture and automatically generates and displays annotation information for the target object.

In another example, the annotation process for the target object may also be as follows: in response to the closing operation for the search picture, if it is detected that the target object is included in the search picture, annotation information about the target object is automatically generated, and the annotation information about the target object is displayed.

In summary, the technical solutions provided by the embodiments of this disclosure support to display the search picture while displaying the flight picture during the flight of the virtual object, so that the flight visual field required by the flight control and the search visual field required by the search operation can be ensured during the flight; and the problem of large searching difficulty caused by the poor identification degree of the reference plane visual field under the flight perspective in the related art can be avoided, thereby reducing the search difficulty and improving the search efficiency.

In addition, by adopting the technical solutions provided by the embodiments of this disclosure, it is possible to overcome the conflict between the flight perspective (such as a heads-up perspective) and the search perspective (such as a top-down perspective), and realize both the flight visual field and the search visual field without frequently switching the flight perspective and the search perspective to realize the flight control and search operation, thereby further improving the search efficiency.

In addition, by following and annotating the target object in the search picture in the search region, faster and more accurate reporting of the target object can be achieved, thereby improving the efficiency of the information annotation. At the same time, based on the report information, the player may much intuitively obtain position, camp, type, and other information about the target object, thereby improving the efficiency of information acquisition. In addition, the report information facilitates more intuitive communication between players and teammates, reducing the impact of different reference systems and different visual fields on the communication, thereby improving communication efficiency and further improving user experience.

Figure 9:
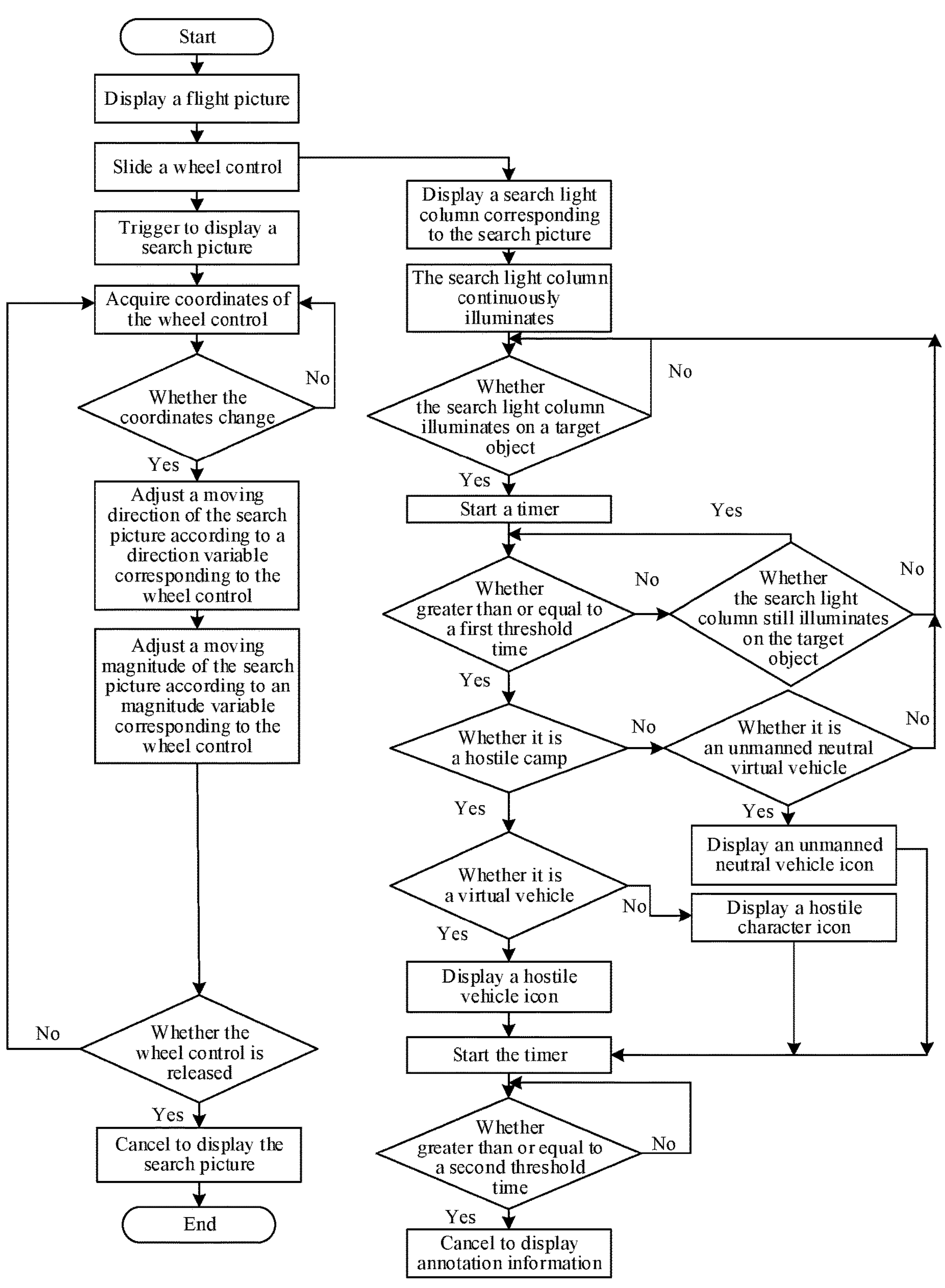
FIG. 9 is a flowchart of an interface display method provided by another embodiment of this disclosure.

In one exemplary embodiment, referring to FIG. 9, taking a virtual flight vehicle in a shooting game application as an example, the interface display method provided by the embodiments of this disclosure may be further as follows: displaying a flight picture in the UI during flight of a virtual flight vehicle, the flight picture being a picture for observing a virtual environment from a flight perspective of the virtual flight vehicle. The flight line of sight corresponding to the flight perspective coincides with the centerline of the virtual flight vehicle, namely, a heads-up perspective.

During a display of the flight picture, a search picture is displayed in the UI in response to the player sliding a wheel control, the search picture being a picture for searching the virtual environment from a search perspective of the virtual flight vehicle, and the virtual environment displayed in the search picture being a local region of the virtual environment displayed in the flight picture. The wheel control is used for controlling the search perspective of the virtual flight vehicle, such as a remote sensing control and a button combination control. The search perspective refers to a perspective used for searching the virtual environment during the flight of the virtual object. In some embodiments, the field of view of the search perspective is less than the field of view of the flight perspective. The initial search line of sight corresponding to the search perspective overlaps the flight line of sight. The visual field region corresponding to the search perspective is the display region corresponding to the search picture.

Coordinates of the wheel control are acquired; if the coordinates of the wheel control change, a moving direction of the search picture is adjusted according to a direction variable corresponding to the wheel control, and a moving magnitude of the search picture is adjusted according to a magnitude variable corresponding to the wheel control. For example, on the basis of the flight line of sight, an adjusted position of the search picture on the screen is calculated based on the direction variable and the magnitude variable corresponding to the wheel control, and the search picture is displayed at the adjusted position. Otherwise, the coordinates of the wheel control are continued to acquire to detect if the coordinates of the wheel control have changed.

If it is detected that the player has released the wheel control, the search picture is cancelled to display. Otherwise, the coordinates of the wheel control are continued to acquire to detect if the coordinates of the wheel control have changed.

In some embodiments, a search light column corresponding to the search picture is displayed while the search picture is displayed in the UI. The search light column refers to a visual rendering effect of a search region corresponding to the search picture, to assist a player in performing a visual search on the target object. For example, if the search region is set as a circular region, the search light column may refer to a cone composed of rays from the starting point of the search line of sight directed to each point in the circular region. The centerline of the search light column overlaps with the search line of sight, the direction of the search light column is the same as the direction of the search line of sight, and the search light column moves following the movement of the search line of sight. The range of the search region may be less than or equal to the range of the display region of the search picture.

During the display of the search picture, the search light column continuously illuminates. If the search light column illuminates the target object, a timer is started. Otherwise, it continues to detect whether the search light column illuminates on the target object. In some embodiments, the timer is turned off if the target object departs from the search light column.

A timing duration is acquired; camp information and type information about the target object are acquired if the timing duration is greater than or equal to a first threshold time, and the timer is turned off. Otherwise, in a case that the search light column still illuminates the target object, it is continuously detected whether the timing duration is greater than or equal to the first threshold time. In a case that the target object departs from the illumination of the search light column, it is continuously detected whether the search light column illuminates the target object.

After obtaining the camp information, first sub-annotation information and second sub-annotation information about the target object are generated according to the camp information and the type information. For example, if the camp information indicates that the target object is a hostile camp, the second sub-annotation information is set to red, otherwise, the second sub-annotation information is set to blue. If the type information indicates that the target object is a virtual vehicle, the first sub-annotation information is set as a triangle, otherwise, the first sub-annotation information is set as a double triangle.

Illustratively, in a case that the target object is a hostile camp, if the target object is a virtual vehicle, a red double triangle icon (that is, a hostile vehicle icon) is displayed above the target object. If the target object is a virtual character, a red single triangle icon (that is, a hostile character icon) is displayed above the target object. In a case that the target object is not a hostile camp, if the target object is an unmanned neutral virtual vehicle, a blue unmanned neutral double triangle icon (namely, an unmanned neutral vehicle icon) is displayed. If the target object is not an unmanned neutral virtual vehicle, it is continuously detected whether the search light column illuminates the target object.

After the target object is locked and the annotation information about the target object (such as the above hostile vehicle icon and hostile character icon) is displayed, a timer is started. A timing duration of the timer is acquired; and if the timing duration is greater than or equal to the second threshold time, the annotation information is cancelled to display, otherwise, continuing to display the annotation information. The second threshold time is greater than the first threshold time.

In summary, the technical solutions provided by the embodiments of this disclosure support to display the search picture while displaying the flight picture during the flight of the virtual object, so that the flight visual field required by the flight control and the search visual field required by the search operation can be ensured during the flight; and the problem of large searching difficulty caused by the poor identification degree of the reference plane visual field under the flight perspective in the related art can be avoided, thereby reducing the search difficulty and improving the search efficiency.

In addition, by adopting the technical solutions provided by the embodiments of this disclosure, it is possible to overcome the conflict between the flight perspective (such as a heads-up perspective) and the search perspective (such as a top-down perspective), and realize both the flight visual field and the search visual field without frequently switching the flight perspective and the search perspective to realize the flight control and search operation, thereby further improving the search efficiency.

The following are apparatus embodiments of this disclosure that may be used for performing method embodiments of this disclosure. For details not disclosed in the apparatus embodiments of this disclosure, reference is made to the method embodiments of this disclosure, for example.

Figures 10, 11:
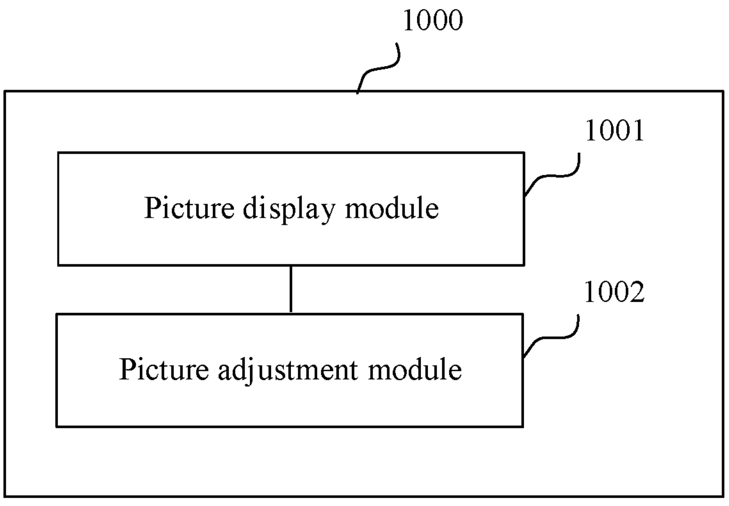
FIG. 10 is a block diagram of an interface display apparatus provided by one embodiment of this disclosure.
FIG. 11 is a block diagram of an interface display apparatus provided by another embodiment of this disclosure.

Referring to FIG. 10, a block diagram of an interface display apparatus provided by one embodiment of this disclosure is shown. The apparatus has functions to implement any of the above methods; and the functions may be implemented by hardware or implemented by the hardware executing corresponding software. The apparatus may be a terminal as described above or may be provided in the terminal. As shown in FIG. 10, the apparatus 1000 includes a picture display module 1001 and a picture adjustment module 1002.

The picture display module 1001 is configured to display a flight picture in a UI during flight of a virtual object, the flight picture being a picture for observing a virtual environment from a flight perspective of the virtual object.

The picture display module 1001 is further configured to display, during a display of the flight picture, a search picture in response to a search operation, the search picture being a picture for searching the virtual environment from a search perspective of the virtual object and the virtual environment displayed in the search picture being a local region of the virtual environment displayed in the flight picture.

The picture adjustment module 1002 is configured to adjust to display the search picture in response to an adjustment operation for the search perspective.

In one exemplary embodiment, the picture display module 1001 is configured to acquire a flight line of sight corresponding to the flight perspective. The picture display module 1001 is configured to determine, in response to a triggering operation for a search control displayed in the UI, an initial search line of sight based on the flight line of sight. The picture display module 1001 is configured to display the search picture based on the initial search line of sight.

In one exemplary embodiment, the picture display module 1001 is further configured to acquire a first collision point between the initial search line of sight and a reference plane of the virtual environment. The picture display module 1001 is configured to determine a region corresponding to the first collision point in the virtual environment as a display region corresponding to the search picture. The picture display module 1001 is configured to display the search picture based on elements in the display region.

In one exemplary embodiment, the picture display module 1001 is further configured to cancel to display the search picture in response to a release operation for the search control.

In one exemplary embodiment, the picture adjustment module 1002 is configured to acquire an adjusted search line of sight corresponding to the search perspective in response to the adjustment operation for the search perspective. The picture adjustment module 1002 is configured to acquire a second collision point between the adjusted search line of sight and a reference plane of the virtual environment. The picture adjustment module 1002 is configured to determine a region corresponding to the second collision point in the virtual environment as an adjusted display region corresponding to the search picture. The picture adjustment module 1002 is configured to adjust to display the search picture based on elements in the adjusted display region.

In one exemplary embodiment, the picture adjustment module 1002 is further configured to acquire a direction variable and a magnitude variable corresponding to the adjustment operation in response to the adjustment operation for the search perspective. The picture adjustment module 1002 is configured to determine, on the basis of the flight line of sight, a direction variable of the search line of sight based on the direction variable corresponding to the adjustment operation. The picture adjustment module 1002 is configured to determine, on the basis of the flight line of sight, a magnitude variable of the search line of sight based on the magnitude variable corresponding to the adjustment operation. The picture adjustment module 1002 is configured to acquire the adjusted search line of sight based on the direction variable of the search line of sight and the magnitude variable of the search line of sight.

In one exemplary embodiment, the picture adjustment module 1002 is further configured to follow the second collision point on a screen, and move to display the search picture. The picture adjustment module 1002 is configured to alternatively, fixedly display the search picture at a set position on the screen.

In one exemplary embodiment, a flight remote sensing control corresponding to the virtual object is displayed in the UI, and a movable region corresponding to the flight remote sensing control includes a flight control region and a search control region. In an initial state, the flight remote sensing control is located at the center of the movable region.

The picture display module 1001 is further configured to display the search picture in response to the flight remote sensing control being moved from the center of the movable region to the search control region.

The picture adjustment module 1002 is further configured to adjust to display the search picture in response to an adjustment operation of the flight remote sensing control in the search control region.

In one exemplary embodiment, the picture adjustment module 1002 is further configured to cancel to display the search picture in response to the flight remote sensing control being moved or released from the search control region to the flight control region.

In one exemplary embodiment, as shown in FIG. 11, the apparatus 1000 further includes an object following module 1003, an information generation module 1004, and an information display module 1005.

The object following module 1003 is configured to control a search region corresponding to the search picture to follow a target object in response to the adjustment operation for the search perspective. The range of the search region is less than or equal to the range of the display region of the search picture.

The information generation module 1004 is configured to generate annotation information about the target object in a case that a duration of the target object in the search region is greater than or equal to a first time threshold, the annotation information being used for annotating and displaying the target object.

The information display module 1005 is configured to display the annotation information about the target object.

In one exemplary embodiment, the object following module 1003 is further configured to detect the search picture.

The information generation module 1004 is further configured to generate annotation information about the target object in a case that it is detected that the search picture includes a target object, the annotation information being used for annotating and displaying the target object.

The information display module 1005 is further configured to display the annotation information about the target object.

In one exemplary embodiment, the annotation information includes first sub-annotation information, second sub-annotation information, and third sub-annotation information, the first sub-annotation information being used for indicating type information about the target object, the second sub-annotation information being used for indicating camp information about the target object, and the third sub-annotation information being used for indicating position information about the target object.

In one exemplary embodiment, the information display module 1005 is further configured to cancel to display the annotation information about the target object in a case that a display duration of the annotation information about the target object is greater than or equal to a second time threshold; or, cancel to display the annotation information about the target object in a case that a distance between the target object and the virtual object is greater than or equal to a first distance threshold; or, cancel to display the annotation information about the target object in a case that it is detected that a virtual life value of the target object is less than or equal to a first life threshold.

In one exemplary embodiment, the search region corresponding to the search picture includes a first display modality and a second display modality.

The picture adjustment module 1002 is further configured to switch the target object from an unlocked state to a locked state and switch the search region from the first display modality to the second display modality in a case that the duration of the target object in the search region is greater than or equal to the first time threshold.

In summary, the technical solutions provided by the embodiments of this disclosure support to display the search picture while displaying the flight picture during the flight of the virtual object, so that the flight visual field required by the flight control and the search visual field required by the search operation can be ensured during the flight; and the problem of large searching difficulty caused by the poor identification degree of the reference plane visual field under the flight perspective in the related art can be avoided, thereby reducing the search difficulty and improving the search efficiency.

In addition, by adopting the technical solutions provided by the embodiments of this disclosure, it is possible to overcome the conflict between the flight perspective (such as a heads-up perspective) and the search perspective (such as a top-down perspective), and realize both the flight visual field and the search visual field without frequently switching the flight perspective and the search perspective to realize the flight control and search operation, thereby further improving the search efficiency.

It should be noted that when the apparatus provided in the above embodiments implements the functions, only division of the above function modules is used as an example for description. In the practical application, the functions may be allocated to and completed by different function modules according to requirements. That is, an internal structure of the device is divided into different function modules, to complete all or some of the functions described above. In addition, the apparatus provided in the foregoing embodiments and the method embodiments fall within a same conception. For details of an exemplary implementation process, reference may be made to the method embodiments. Details are not described herein again.

Figure 12:
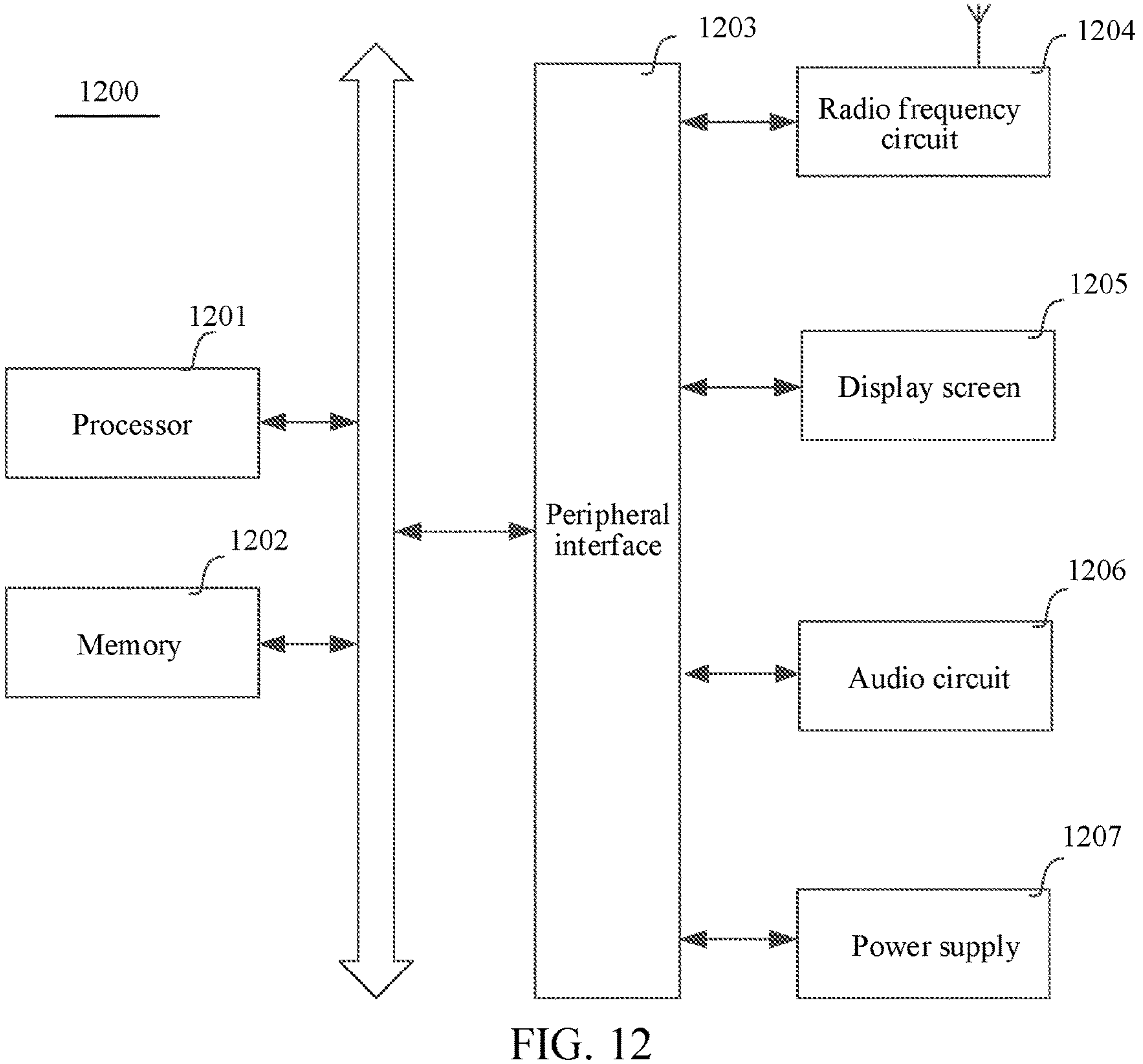
FIG. 12 is a block diagram of a terminal provided by one embodiment of this disclosure.

Referring to FIG. 12, a structural block diagram of a terminal 1200 provided by one embodiment of this disclosure is shown. The terminal is configured to implement the interface display method provided in the above embodiments. The terminal may be a terminal 10 in the implementation environment shown in FIG. 1.

In an example, the terminal 1200 generally includes a processor 1201 and a memory 1202.

In some embodiments, processing circuitry such as the processor 1201 may include one or more processing cores, such as a 4-core processor and an 8-core processor. The processor 1201 may be implemented in hardware in the form of at least one of digital signal processing (DSP), field-programmable gate array (FPGA), and programmable logic array (PLA). The processor 1201 includes a main processor and a co-processor, the main processor being a processor for processing data in a wake-up state, also referred to as central processing unit (CPU), and the co-processor being a low-power processor for processing data in a standby state. In some embodiments, the processor 1201 may be integrated with a graphics processing unit (GPU), the GPU being configured to render and draw the content required by a display screen. In some embodiments, the processor 1201 may further include an artificial intelligence (AI) processor. The AI processor is configured to process computing operations related to machine learning.

In some embodiments, the memory 1202 may include one or more computer-readable storage media; the computer-readable storage media may be non-transitory. The memory 1202 may further include a high-speed random-access memory and a nonvolatile memory, for example, one or more disk storage devices and flash storage devices. In some embodiments, the non-transitory computer-readable storage media in the memory 1202 are used for storing at least one instruction, at least one piece of program, set of code, or set of instructions, which are configured to be executed by one or more processors to implement the above interface display method.

In some embodiments, the terminal 1200 may also include a peripheral interface 1203 and at least one peripheral. The processor 1201, the memory 1202, and the peripheral interface 1203 may be connected through a bus or a signal line. Each peripheral may be connected to the peripheral interface 1203 through a bus, a signal line, or a circuit board. In particular, the peripheral includes at least one of a radio frequency circuit 1204, a display screen 1205, an audio circuit 1206, and a power supply 1207.

The skilled in the art may understand that the structure shown in FIG. 12 constitutes no limitation on the terminal 1200 and may include more or fewer assemblies than those shown in the drawing, or combine some assemblies, or employ different assembly arrangements.

In one exemplary embodiment, there is further provided a computer-readable storage medium storing at least one instruction, at least one piece of program, a set of codes, or a set of instructions which, when executed by a processor, implement the above interface display method.

In some embodiments, the computer-readable storage medium may include read-only memory (Rom), random-access memory (RAM), solid state drives (SSD), optical disk, and the like. The random-access memory may include resistance random-access memory (ReRAM) and dynamic random-access memory (DRAM).

In one exemplary embodiment, there is further provided a computer program product or computer programs including computer instructions stored in the computer-readable storage medium. A processor of the terminal reads the computer instructions from the computer-readable storage medium, and the processor executes the computer instructions to cause the terminal to execute the above interface display method.

The term module (and other similar terms such as unit, submodule, etc.) in this disclosure may refer to a software module, a hardware module, or a combination thereof. A software module (e.g., computer program) may be developed using a computer programming language and stored in memory or non-transitory computer-readable medium. The software module stored in the memory or medium is executable by a processor to thereby cause the processor to perform the operations of the module. A hardware module may be implemented using processing circuitry, including at least one processor and/or memory. Each hardware module can be implemented using one or more processors (or processors and memory). Likewise, a processor (or processors and memory) can be used to implement one or more hardware modules. Moreover, each module can be part of an overall module that includes the functionalities of the module. Modules can be combined, integrated, separated, and/or duplicated to support various applications. Also, a function being performed at a particular module can be performed at one or more other modules and/or by one or more other devices instead of or in addition to the function performed at the particular module. Further, modules can be implemented across multiple devices and/or other components local or remote to one another. Additionally, modules can be moved from one device and added to another device, and/or can be included in both devices.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

"A plurality of" mentioned in the specification means two or more. "And/or", describing an associated relationship of an associated object, represents that there may be three relationships, for example, A and/or B, may represent that there are three cases of A alone, A and B together, and B alone. The character "/" generally indicates an "or" relationship between the associated objects. In addition, the step numbers described in the specification merely illustratively show a possible execution sequence between the steps. In some other embodiments, the above steps may not be performed according to the number sequence. For example, two steps with different numbers may be performed simultaneously, or the two steps with different numbers may be performed according to a sequence contrary to the sequence shown in the drawing. This is not limited in the embodiments of this disclosure.

The above are merely exemplary embodiments of this disclosure, and are not intended to limit this disclosure. Other embodiments, including modification or equivalent replacement, shall fall within the scope of this disclosure.

What is claimed is:

1. A method for displaying a search image, the method comprising:

displaying a virtual scene of a video game from a primary perspective of a virtual object that is in flight and a user interface (UI);

displaying, with the UI, the search image from a search perspective of the virtual object, the search perspective being displayed in a localized region of the virtual scene concurrently with the primary perspective of the virtual scene, in response to a continuous touch operation to search for a target virtual object that is configured to move in the virtual scene, the search perspective of the localized region being different from the primary perspective of the localized region of the virtual scene; and updating the display of the search image in response to an adjustment of the search perspective of the virtual object according to the continuous touch operation.

2. The method according to claim 1, wherein the displaying the search image comprises:

acquiring a flight line of sight corresponding to the primary perspective of the virtual object;

determining, when the continuous touch operation performed on a search control element displayed in the UI starts, an initial search line of sight based on the flight line of sight; and displaying the search image based on the initial search line of sight.

3. The method according to claim 2, wherein the displaying the search image based on the initial search line of sight comprises:

acquiring a first collision point between the initial search line of sight and a reference plane of the virtual scene;

determining a region corresponding to the first collision point in the virtual scene as the localized region corresponding to the search image; and displaying the search image based on the localized region.

4. The method according to claim 2, further comprising:

cancelling the display of the search image when the continuous touch operation performed on the search control element ends.

5. The method according to claim 1, wherein the updating the display of the search image comprises:

determining an adjusted search line of sight corresponding to the search perspective of the virtual object in response to the adjustment of the search perspective of the virtual object;

determining a second collision point between the adjusted search line of sight and a reference plane of the virtual scene;

determining a region corresponding to the second collision point in the virtual scene as an adjusted localized region corresponding to the search image; and updating the display of the search image based on the adjusted localized region.

6. The method according to claim 5, wherein the determining the adjusted search line of sight comprises:

determining a direction and a magnitude of the adjustment of the search perspective of the virtual object;

determining, based on a flight line of sight corresponding to the primary perspective of the virtual object, a direction of a search line of sight based on the direction of the adjustment;

determining, based on the flight line of sight, a magnitude of the search line of sight based on the magnitude of the adjustment; and determining the adjusted search line of sight based on the determined direction and the determined magnitude.

7. The method according to claim 5, wherein a position of the search image in the UI changes based on a position of the second collision point.

8. The method according to claim 5, wherein a position of the search image in the UI is fixed.

9. The method according to claim 1, wherein the UI includes a search control element that is configured to move within a search control region based on the continuous touch operation, the displaying the search image includes displaying the search image based on the continuous touch operation being performed on the search control element, and the updating the display of the search image includes updating the display of the search image based on a position of the search control element within the search control region based on the continuous touch operation.

10. The method according to claim 9, further comprising:

cancelling the display of the search image when movement of the virtual object is controlled by another touch operation.

11. The method according to claim 1, further comprising:

controlling a search region corresponding to the search image to follow a target virtual object based on the adjustment of the search perspective of the virtual object, the search region being less than or equal to the localized region of the virtual scene;

generating annotation information of the target virtual object when a duration of the target virtual object in the search region is greater than or equal to a first time threshold; and displaying the annotation information of the target virtual object.

12. The method according to claim 1, further comprising:

generating annotation information of a target virtual object when the search image is determined to include the target virtual object; and displaying the annotation information of the target virtual object.

13. The method according to claim 11, wherein the annotation information includes first sub-annotation information, second sub-annotation information, and third sub-annotation information, the first sub-annotation information indicating type information of the target virtual object, the second sub-annotation information indicating team information of the target virtual object, and the third sub-annotation information indicating position information of the target virtual object.

14. The method according to claim 11, further comprising:

cancelling the display of the annotation information when at least one of a display duration of the annotation information of the target virtual object is greater than or equal to a second time threshold, a distance between the target virtual object and the virtual object is greater than or equal to a first distance threshold, or a virtual value of the target virtual object is less than or equal to a first value threshold.

15. The method according to claim 1, further comprising: switching a search region from a first display mode to a second display mode when a duration of the target virtual object in the search region is greater than or equal to a first time threshold.

16. An information processing apparatus, comprising: processing circuitry configured to:

display a virtual scene of a video game from a primary perspective of a virtual object that is in flight and a user interface (UI);

display, with the UI, a search image from a search perspective of the virtual object, the search perspective being displayed in a localized region of the virtual scene concurrently with the primary perspective of the virtual scene, in response to a continuous touch operation to search for a target virtual object that is configured to move in the virtual scene, the search perspective of the localized region being different from the primary perspective of the localized region of the virtual scene; and update the display of the search image in response to an adjustment of the search perspective of the virtual object according to the continuous touch operation.

17. The information processing apparatus according to claim 16, wherein the processing circuitry is configured to:

acquire a flight line of sight corresponding to the primary perspective of the virtual object;

determine, when the continuous touch operation performed on a search control element displayed in the UI starts, an initial search line of sight based on the flight line of sight; and display the search image based on the initial search line of sight.

18. The information processing apparatus according to claim 17, wherein the processing circuitry is configured to:

acquire a first collision point between the initial search line of sight and a reference plane of the virtual scene;

determine a region corresponding to the first collision point in the virtual scene as the localized region corresponding to the search image; and display the search image based on the localized region.

19. The information processing apparatus according to claim 17, wherein the processing circuitry is configured to:

cancel the display of the search image when the continuous touch operation performed on the search control element ends.

20. A non-transitory computer-readable storage medium storing instructions which when executed by a processor cause the processor to perform:

displaying a virtual scene of a video game from a primary perspective of a virtual object that is in flight and a user interface (UI);

displaying, with the UI, a search image from a search perspective of the virtual object, the search perspective being displayed in a localized region of the virtual scene concurrently with the primary perspective of the virtual scene, in response to a continuous touch operation to search for a target virtual object that is configured to move in the virtual scene, the search perspective of the localized region being different from the primary perspective of the localized region of the virtual scene; and updating the display of the search image in response to an adjustment of the search perspective of the virtual object according to the continuous touch operation.

* * * * *